UNITED STATES PATENT OFFICE.

HEINRICH HOERLEIN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

ACYL DERIVATIVE OF MORPHIN.

994,465. Specification of Letters Patent. Patented June 6, 1911.

No Drawing. Application filed May 3, 1910. Serial No. 559,157. (Specimens.)

*To all whom it may concern:*

Be it known that I, HEINRICH HOERLEIN, doctor of philosophy, chemist, citizen of the German Empire, residing at Vohwinkel, near Elberfeld, Germany, have invented new and useful Improvements in New Acyl Derivatives of Morphin, of which the following is a specification.

My invention relates to a new therapeutic substance, formylmorphin, as such and in the form of its salts.

The process for its production consists in treating morphin with formic acid. Monoformylmorphin is thus obtained. It is a white crystalline powder soluble in dilute caustic soda lye and gives the characteristic blue color of morphin by the addition of chlorid of iron to its neutral solution; which proves that the alcoholic hydroxyl group is esterified while the phenolic group is unoccupied. It is more soluble in alcohol and chloroform than morphin and soluble with difficulty in ether and water the aqueous solution showing a strongly alkaline reaction against litmus. The new compound has the formula: $C_{17}H_{18}NO_2.OCOH$ and melts at 220–225° C. It is produced according to the following formula:

$$C_{17}H_{18}NO_2.OH + HCOOH = C_{17}H_{18}NO_2.COH + H_2O.$$

It is less poisonous than the known acyl derivatives of morphin and shows the same valuable narcotic and soothing but a smaller hypnotic action. It can be used as a mild narcotic agent as in cases of cough and bronchial catarrh and can also be used in the shape of its salts, such as the hydrochlorid which is easily soluble in water. The hydrochlorid of formylmorphin is produced by suspending 1 part of formylmorphin in 10 parts of absolute alcohol and adding — while stirring — the theoretical amount of aqueous concentrated hydrochloric acid. The reaction of the liquor must show acid reaction with congo paper. In this way a clear solution is first obtained from which after a while the hydrochlorid crystallizes out. An average dose of the new product is about 0.005 grams as a sedative, in larger doses it acts as a narcotic like morphin.

In a vessel provided with a reflux condenser 10 parts by weight of morphin (free from water) are boiled for 5–6 hours together with 50 parts by weight of 100 per cent. formic acid. The excess of formic acid is distilled off, water is added to the residue and the formyl-morphin is precipitated from the solution by the addition of sodium carbonate and is filtered off.

I claim:—

As a new article of manufacture, formylmorphin, having the formula:

$$C_{17}H_{18}NO_2.OCOH$$

being a white crystalline powder melting at 220–225° C., more soluble in alcohol and chloroform than morphin and difficultly soluble in ether and water the aqueous solution showing a strongly alkaline reaction against litmus, forming salts with acids which possess the same therapeutical properties as the base itself, substantially as described.

In testimony whereof I have hereunto set my hand in the presence of two subscribing witnesses.

HEINRICH HOERLEIN. [L. S.]

Witnesses:
   OTTO KÖNIG,
   CHAS. J. WRIGHT.

Correction in Letters Patent No. 994,465.

It is hereby certified that in Letters Patent No. 994,465, granted June 6, 1911, upon the application of Heinrich Hoerlein, of Vohwinkel, near Elberfeld, Germany, for an improvement in "Acyl Derivatives of Morphin," an error appears n the printed specification requiring correction as follows: Line 31, second line of formula, after the symbol "$NO_2$," the symbol $O$. should be inserted; and that the said Letters Patent should be read with this correction therein that the same may conform to the record of the case in the Patent Office.

Signed and sealed this 8th day of August, A. D., 1911.

[SEAL.]

E. B. MOORE,

Commissioner of Patents.